United States Patent
Kato

(10) Patent No.: US 12,177,406 B2
(45) Date of Patent: Dec. 24, 2024

(54) SERVER, NON-TRANSITORY COMPUTER-READABLE RECORDING MEDIUM STORING COMPUTER-READABLE INSTRUCTIONS FOR SERVER, METHOD PERFORMED BY SERVER, COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE

(71) Applicant: BROTHER KOGYO KABUSHIKI KAISHA, Nagoya (JP)

(72) Inventor: Shuhei Kato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/357,542

(22) Filed: Jul. 24, 2023

(65) Prior Publication Data
US 2024/0040054 A1    Feb. 1, 2024

(30) Foreign Application Priority Data

Jul. 27, 2022  (JP) ................................ 2022-119805
Mar. 30, 2023  (JP) ................................ 2023-056377

(51) Int. Cl.
H04N 1/00    (2006.01)
G06Q 30/0283   (2023.01)
H04N 1/34    (2006.01)

(52) U.S. Cl.
CPC ......... *H04N 1/346* (2013.01); *G06Q 30/0283* (2013.01); *H04N 1/00005* (2013.01); (Continued)

(58) Field of Classification Search
None
See application file for complete search history.

(56) References Cited

U.S. PATENT DOCUMENTS

| 8,047,626 B1* | 11/2011 | Derhak | G06Q 30/0283 358/1.15 |
| 2002/0054340 A1* | 5/2002 | Tokutomi | G03G 15/55 399/24 |

(Continued)

FOREIGN PATENT DOCUMENTS

| JP | 2003050878 | * | 2/2003 | ............... G06F 3/12 |
| JP | 2003281415 | * | 10/2003 | ............... G06F 3/12 |

(Continued)

*Primary Examiner* — Beniyam Menberu
(74) *Attorney, Agent, or Firm* — Merchant & Gould P.C.

(57) ABSTRACT

A server disclosed herein may receive, from a printer, print quantity information related to a print quantity of the printer, calculate a first cost by using the print quantity information, and calculate a second cost by using the print quantity information. The first cost may be a print cost when the printer does not receive provision of a print service realized by the server. The second cost may be a print cost when the printer receives the provision of the print service. The server may output related information which is related to the calculated first cost and the calculated second cost.

16 Claims, 8 Drawing Sheets

Figure 1:
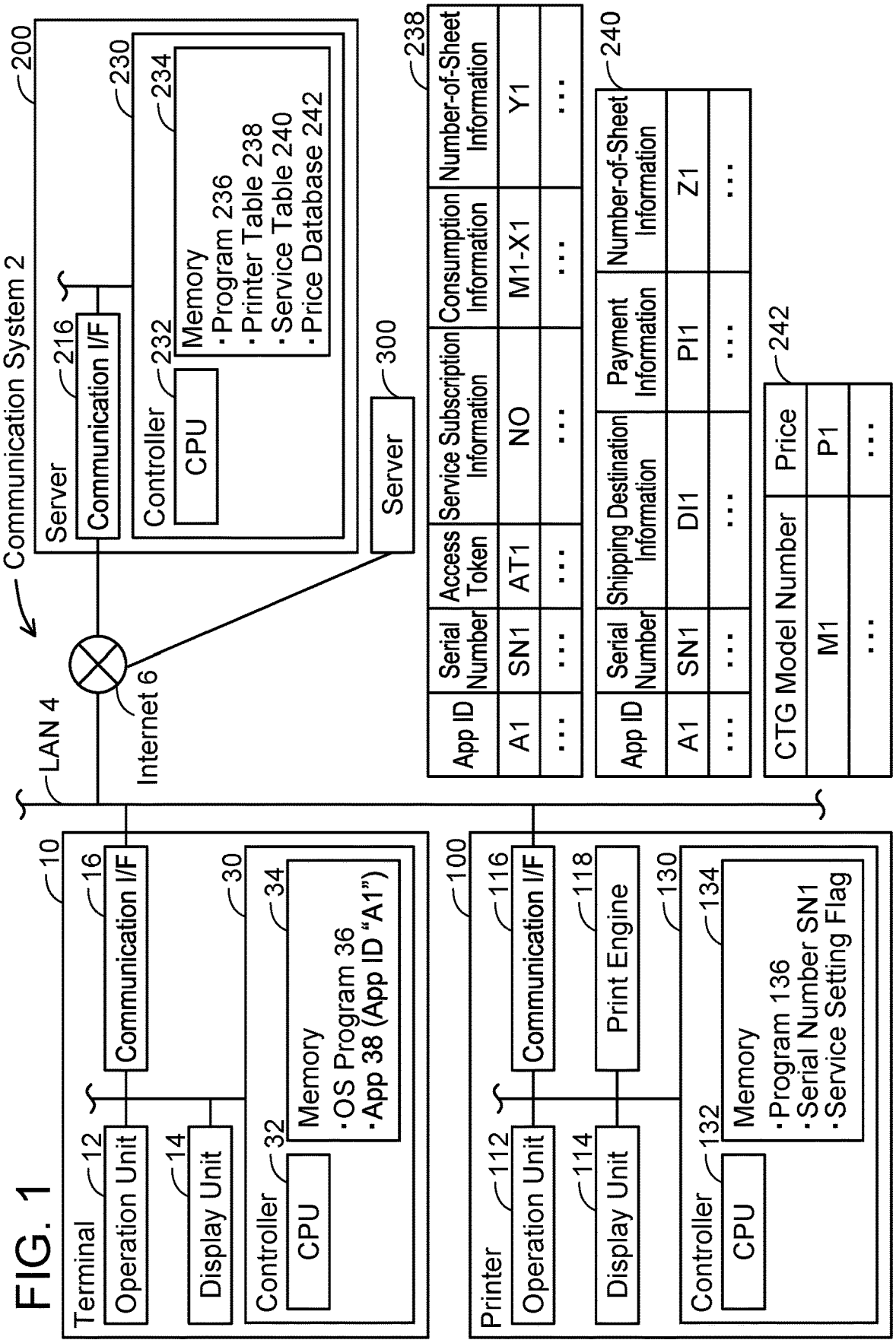

(52) U.S. Cl.
CPC ..... *H04N 1/00023* (2013.01); *H04N 1/00068* (2013.01); *H04N 1/00477* (2013.01)

(56) References Cited

U.S. PATENT DOCUMENTS

2004/0233472 A1* 11/2004 Gassho ................ G06F 11/008
                                                    358/1.15
2018/0182021 A1*  6/2018 Sugamata ............... H04L 67/10

FOREIGN PATENT DOCUMENTS

| JP | 2004070567   | * | 3/2004 | ............... G06F 3/12 |
| JP | 2004-177736 A |   | 6/2004 | |
| JP | 2004155567   | * | 6/2004 | ............. G06Q 10/08 |
| JP | 2004272670   | * | 9/2004 | ............... G06F 3/12 |
| JP | 2004272671   | * | 9/2004 | ............... G06F 3/12 |
| JP | 2005070818   | * | 3/2005 | ............... G06F 3/12 |
| JP | 2006035856   | * | 2/2006 | ............... H04N 1/00 |
| JP | 2013010283   | * | 1/2013 | ............. B41J 2/175 |

\* cited by examiner (First Embodiment Case B)

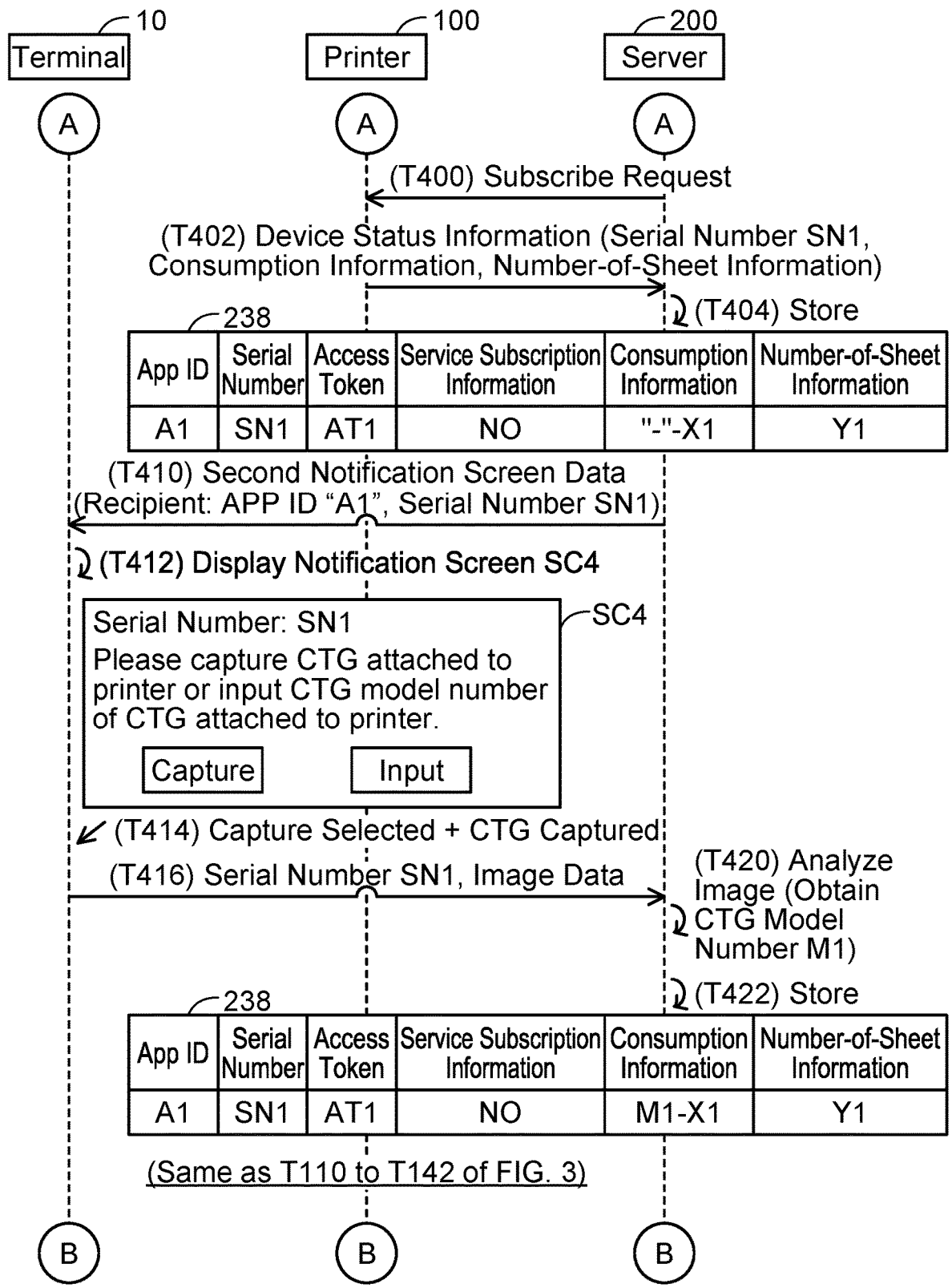

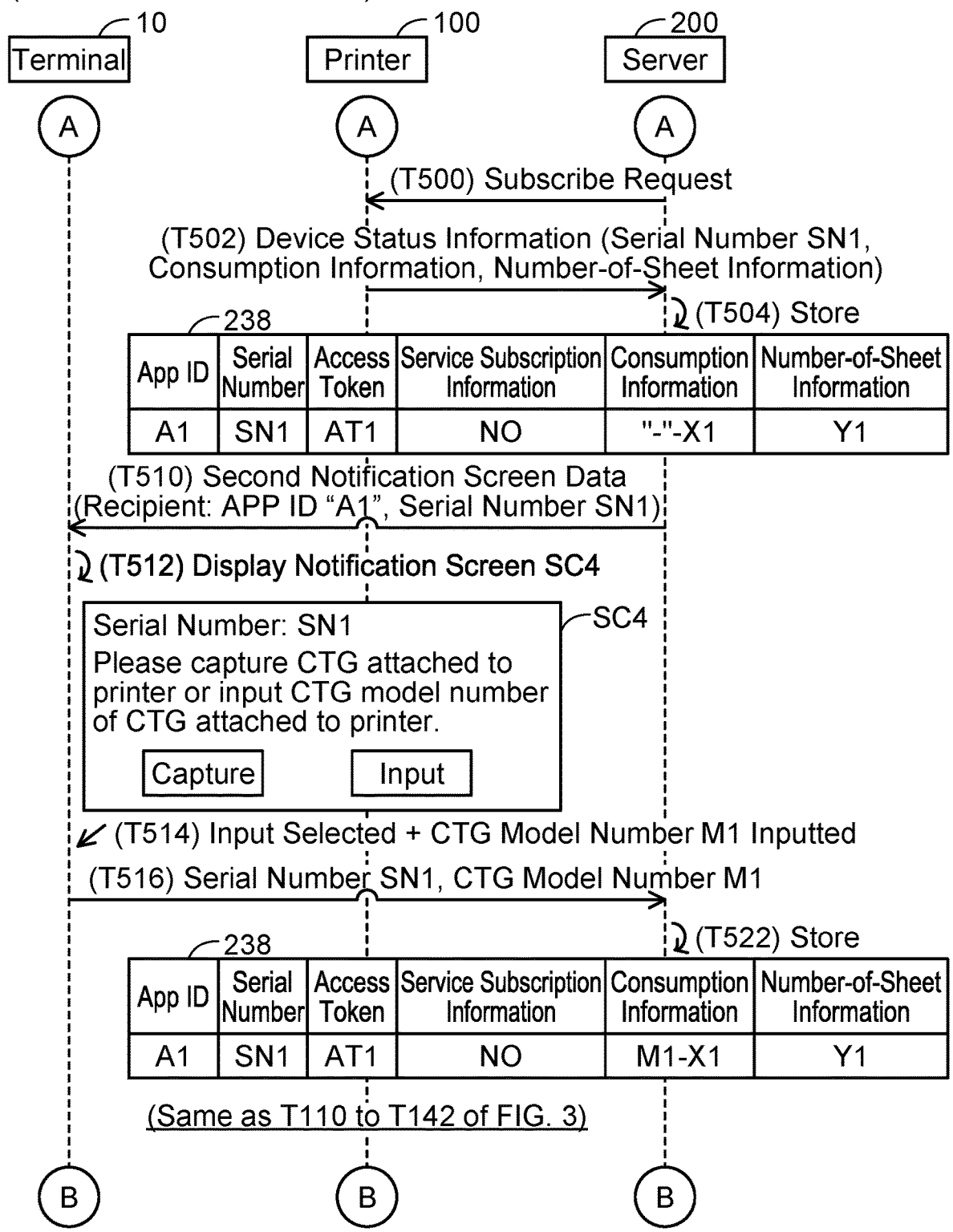

SERVER, NON-TRANSITORY
COMPUTER-READABLE RECORDING
MEDIUM STORING
COMPUTER-READABLE INSTRUCTIONS
FOR SERVER, METHOD PERFORMED BY
SERVER, COMMUNICATION DEVICE,
NON-TRANSITORY COMPUTER-READABLE
RECORDING MEDIUM STORING
COMPUTER-READABLE INSTRUCTIONS
FOR COMMUNICATION DEVICE, AND
METHOD PERFORMED BY
COMMUNICATION DEVICE

REFERENCE TO RELATED APPLICATIONS

This application claims priority from Japanese Patent Applications No. 2022-119805 filed on Jul. 27, 2022 and Japanese Patent Application No. 2023-056377 filed on Mar. 30, 2023. The entire contents of the priority applications are incorporated herein by reference.

BACKGROUND ART

A notification system for notification of consumption of consumables of an image formation device is known. In this system, a cost for printing in an imaging quality mode selected by the user (e.g., a cost of each color of toner and the total costs of all the colors of toner) is calculated. Then, an imaging quality mode that can achieve a lower print cost than the imaging quality mode selected by the user is displayed as a recommended mode.

The present disclosure provides a technique to improve user convenience of a printer.

DESCRIPTION

A server disclosed herein may include a controller; wherein the controller may be configured to: receive, from a printer, print quantity information related to a print quantity of the printer; calculate a first cost by using the print quantity information, the first cost being a print cost when the printer does not receive provision of a print service realized by the server; calculate a second cost by using the print quantity information, the second cost being a print cost when the printer receives the provision of the print service; and output related information which is related to the calculated first cost and the calculated second cost.

According to the above configuration, by using the print quantity information related to the print quantity of the printer, the server calculates the first cost which is a print cost when the printer does not receive the provision of the print service and the second cost which is a print cost when the printer receives the provision of the print service. The server then outputs the related information related to the first cost and the second cost. By viewing the related information, the user can check whether he or she should receive the provision of the print service. This improves user convenience.

Furthermore, a communication device disclosed herein may include a controller; wherein the controller may be configured to: obtain print quantity information related to a print quantity of a printer; calculate a first cost by using the print quantity information, the first cost being a print cost when the printer does not receive provision of a print service realized by a server; calculate a second cost by using the print quantity information, the second cost being a print cost when the printer receives the provision of the print service; and output related information which is related to the calculated first cost and the calculated second cost.

According to the above configuration, by using the print quantity information related to the print quantity of the printer, the printer calculates the first cost which is a print cost when the printer does not receive the provision of the print service and the second cost which is a print cost when the printer receives the provision of the print service. The communication device then outputs the related information related to the first cost and the second cost. By viewing the related information, the user can check whether he or she should receive the provision of the print service. This improves user convenience.

A computer program for the above server, a non-transitory computer-readable recording medium storing the above computer program, and a method performed by the server are also novel and useful. Furthermore, a computer program for the above communication device, a non-transitory computer-readable recording medium storing the above computer program, and a method performed by the communication device are also novel and useful.

Figure 2:
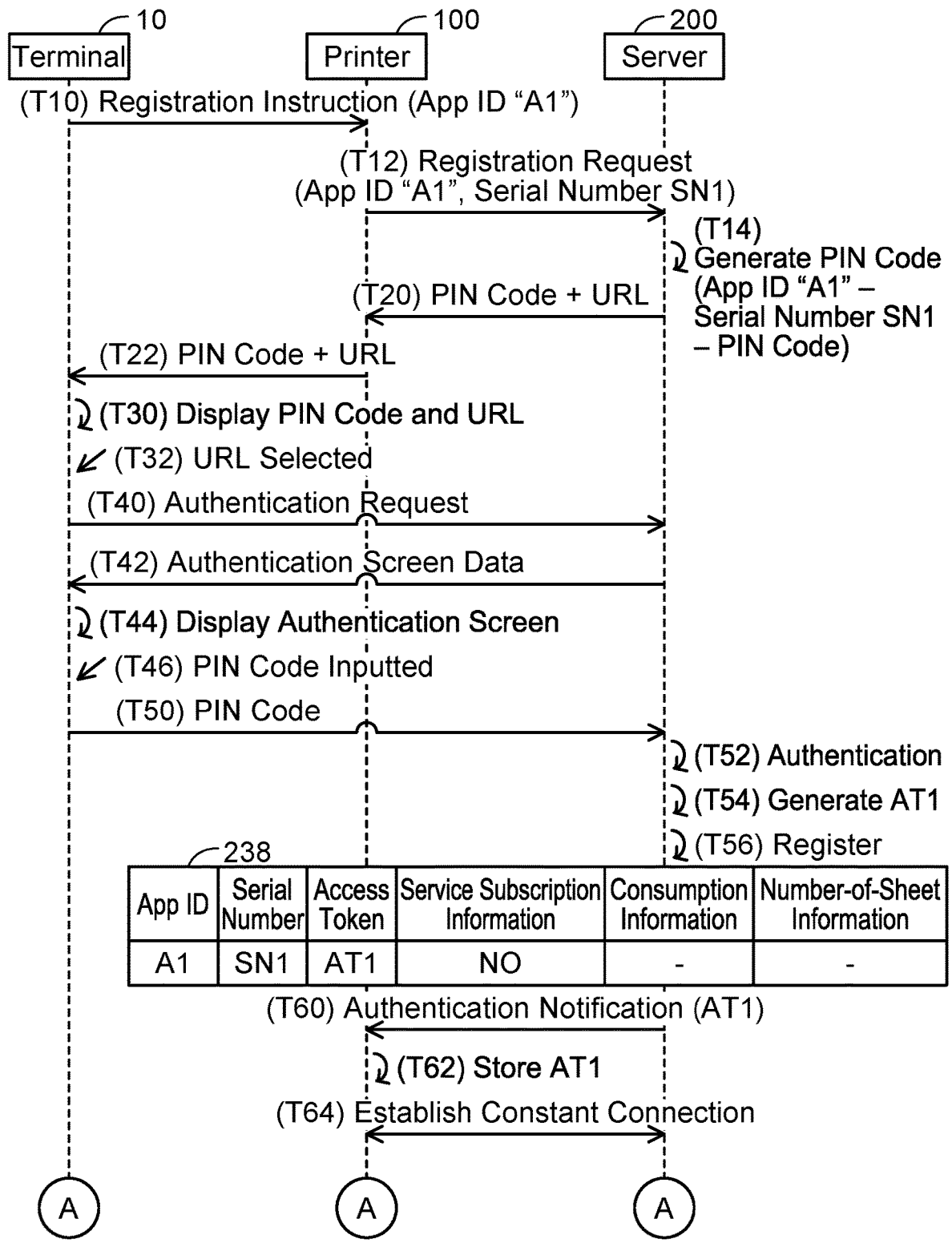
Figure 3:
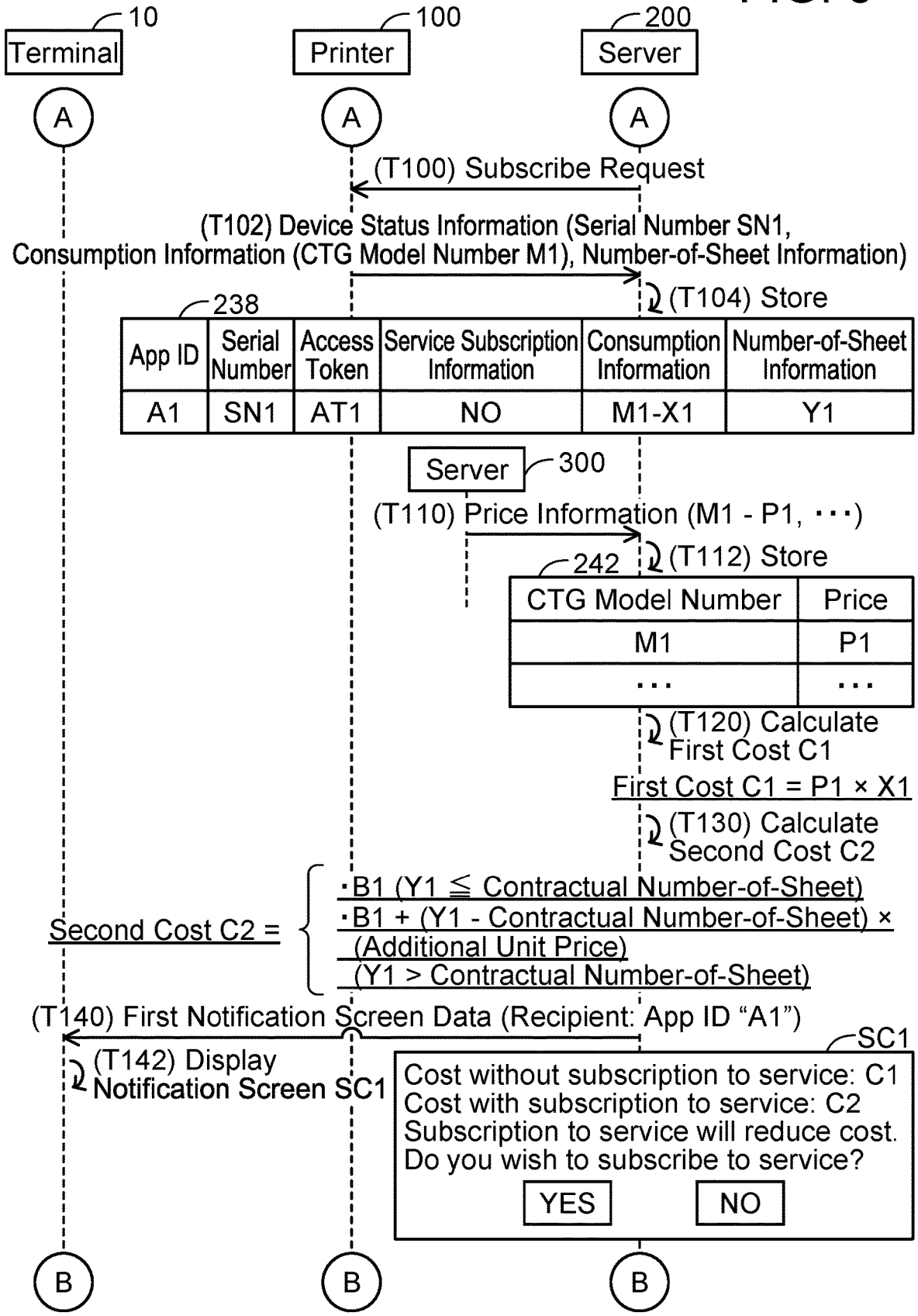
Figure 4:
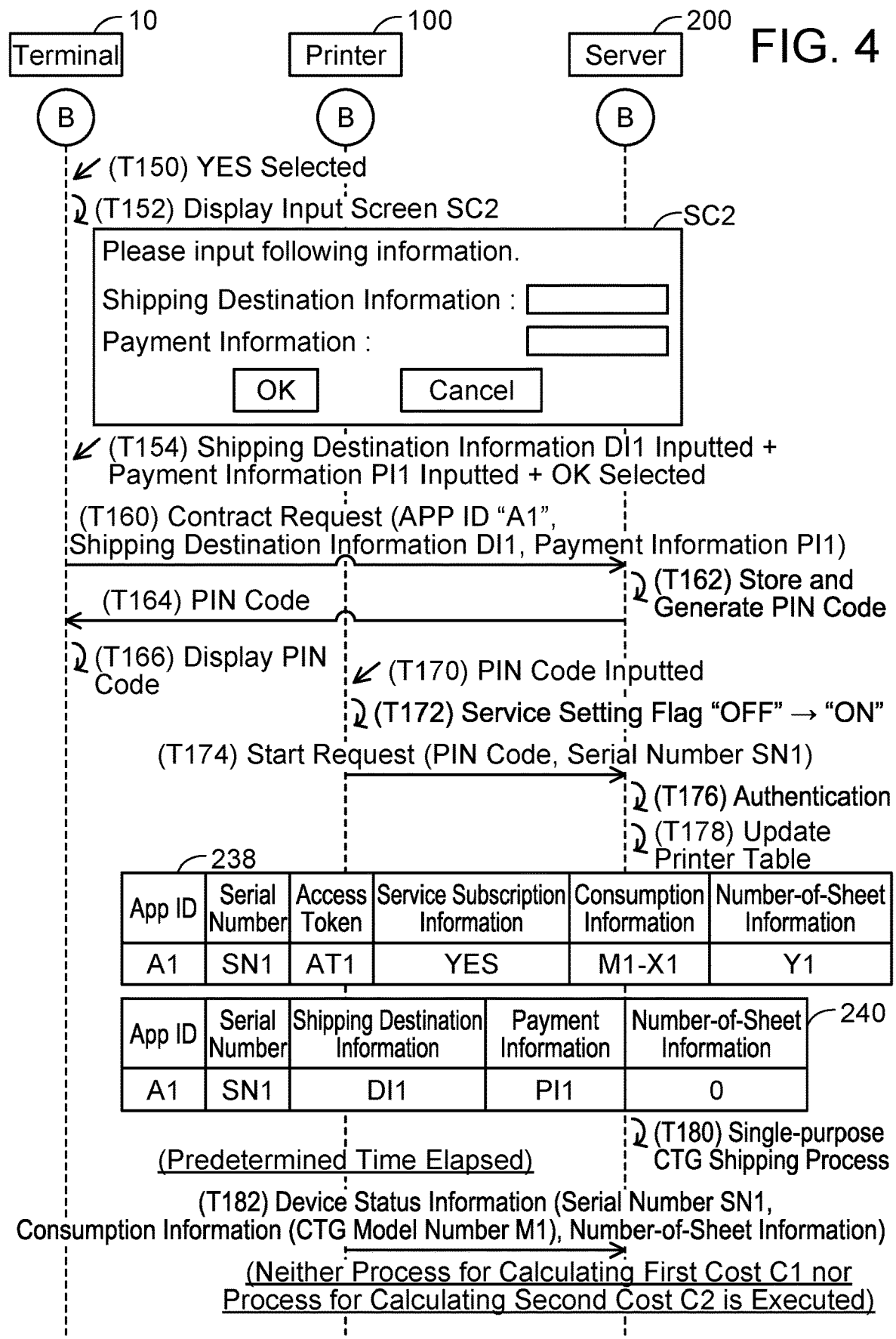
Figure 5:
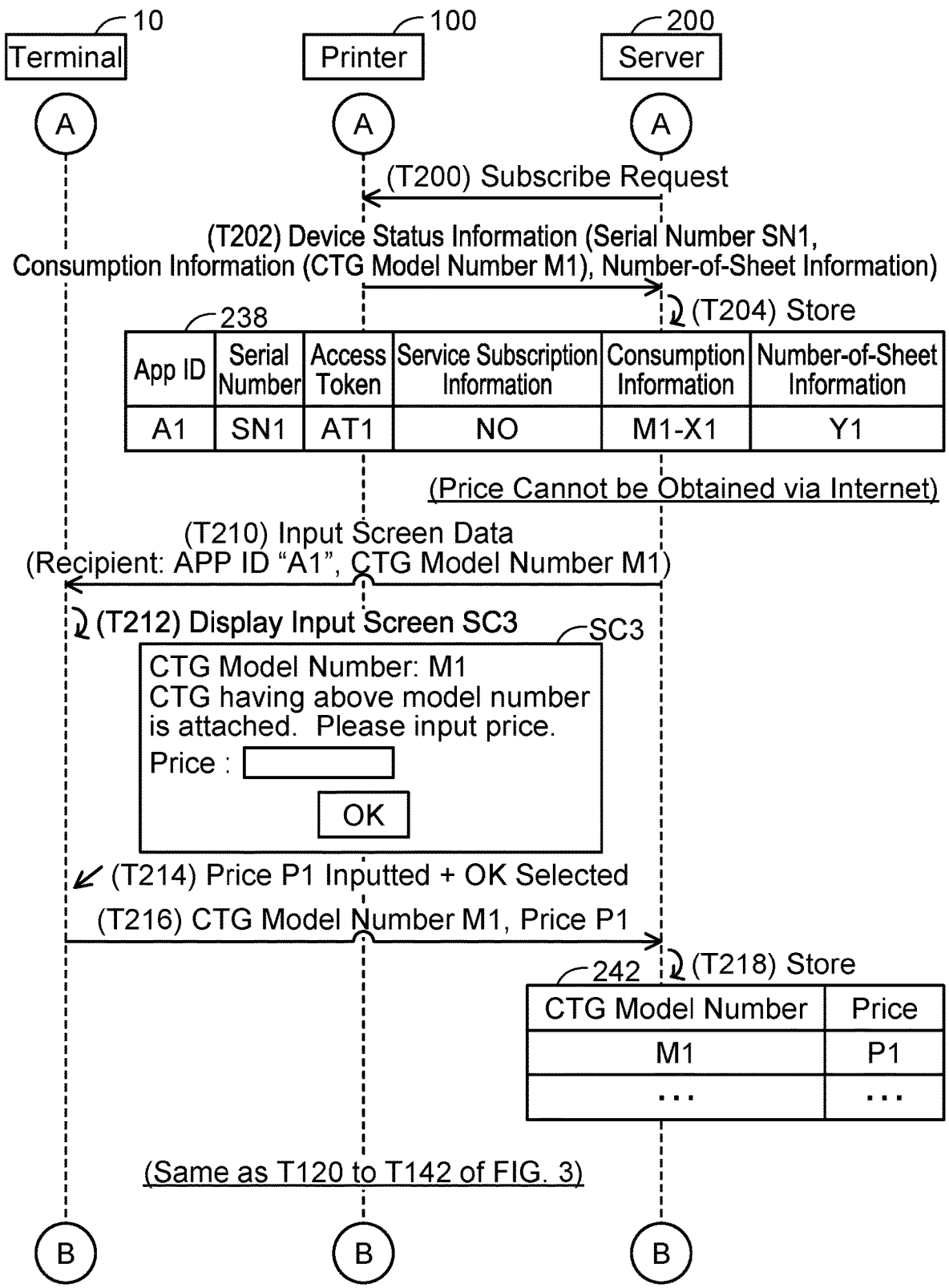
Figure 6:
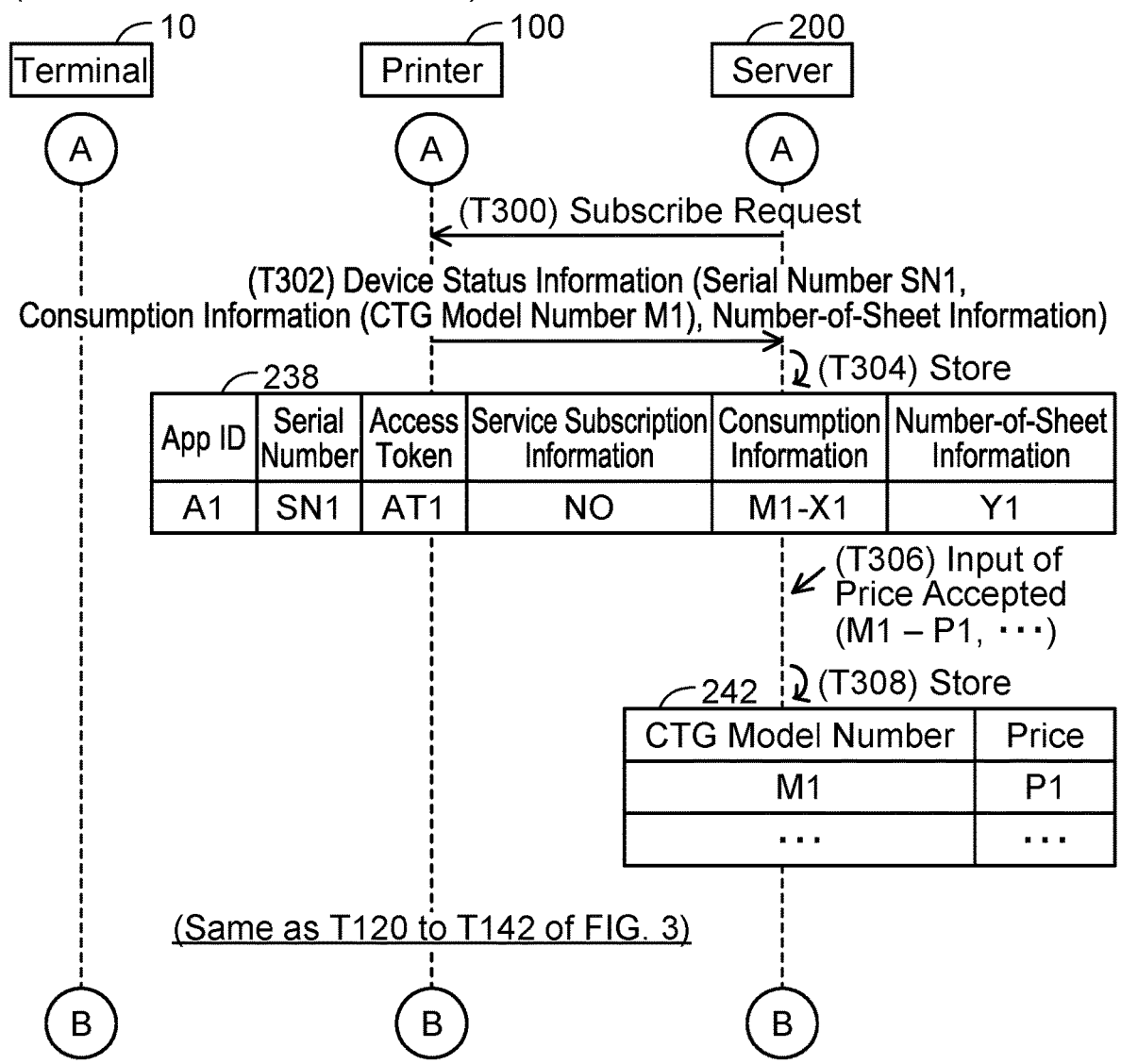

FIG. 1 illustrates a configuration of a communication system.
FIG. 2 illustrates a sequence diagram for registering information of a printer with a server.
FIG. 3 illustrates a sequence diagram of Case A.
FIG. 4 illustrates a sequence diagram continued from FIG. 3.
FIG. 5 illustrates a sequence diagram of Case B.
FIG. 6 illustrates a sequence diagram of Case C.
FIG. 7 illustrates a sequence diagram of Case D.
FIG. 8 illustrates a sequence diagram of Case E.

FIRST EMBODIMENT (Configuration of Communication System 2; FIG. 1)

As illustrated in FIG. 1, a communication system 2 includes a terminal 10, a printer 100, and two servers 200 and 300. The terminal 10 and the printer 100 are connected to a Local Area Network (LAN) 4. The LAN 4 is a wireless LAN formed by an access point (not illustrated). In a modification, the LAN 4 may be a wired LAN. The terminal 10 and the printer 100 can communicate with each other via the LAN 4. The LAN 4 is connected to the Internet 6. The servers 200 and 300 are connected to the Internet 6. Therefore, the terminal 10 and the printer 100 can communicate with the servers 200 and 300 via the LAN 4 and the Internet 6.

(Configuration of Terminal 10)

The terminal 10 is a portable terminal device, such as a cell phone, a smartphone, a PDA, a tablet PC, or a laptop PC. In a modification, the terminal 10 may be a stationary PC. The terminal 10 includes an operation unit 12, a display unit 14, a communication interface 16, and a controller 30. Each of the units 12 to 30 is connected to a bus line (reference sign omitted). Hereinafter, the interface will be described as "I/F".

The operation unit 12 is an OF for inputting various information to the terminal 10, and includes a touch screen, buttons, and the like. The user can input various information to the terminal 10 via the operation unit 12. The display unit 14 is a display for displaying various information. The communication OF 16 is connected to the LAN 4.

The controller 30 includes a CPU 32 and a memory 34. The CPU 32 executes various processes according to programs 36, 38, and the like stored in the memory 34. The Operating System (OS) program 36 is a program for controlling basic operations of the terminal 10. The application program 38 is an application program for managing a printer (e.g., the printer 100) and is configured to register various information of the printer with the server 200. Hereinafter, the OS program 36 and the application program 38 will be described as "OS 36" and "app 38", respectively. The app 38 is installed to the terminal 10 from a server on the Internet (not illustrated) provided by a vendor of the OS 36 or a vendor of the printer 100. The app 38 is assigned an app ID "A1" to identify the app 38.

(Configuration of Printer 100)

The printer 100 is a peripheral device (e.g., a peripheral device of the terminal 10) configured to execute a printing function. In a modification, the printer 100 may be a multifunctional device configured to execute a scanning function, a facsimile function, and the like, in addition to the printing function. The printer 100 includes an operation unit 112, a display unit 114, a communication OF 116, a print engine 118, and a controller 130. Each of the units 112 to 130 is connected to a bus line (reference sign omitted).

The operation unit 112 is an I/F for inputting various information to the printer 100, and includes a touch screen, buttons, and the like. The user can input various information to the printer 100 via the operation unit 112. The display unit 114 is a display for displaying various information. The communication I/F 116 is connected to the LAN 4. The print engine 118 includes a printing mechanism of an inkjet scheme. Although not illustrated, an ink cartridge is attached to the print engine 118. The print engine 118 is configured to execute printing on a print medium by using ink in the ink cartridge. Hereafter, the cartridge will be referred to as "CTG".

The controller 130 includes a CPU 132 and a memory 134. The CPU 132 executes various processes according to a program 136 stored in the memory 134. The memory 134 further stores a serial number "SN1", which is unique information for identifying the printer 100, and a service setting flag. The service setting flag indicates either "ON", indicating that the printer 100 is in the state to receive the provision of a flat-rate print service from the server 200, or "OFF", indicating that the printer 100 is in the state not to receive the provision of the flat-rate print service.

(Configuration of Server 200)

The server 200 is a server configured to manage information of a plurality of printers and provides a flat-rate print service. The server 200 is a server installed by the vendor of the printer 100. In a modification, the server 200 may be a server installed by a business entity different from the vendor of the printer 100. In the flat-rate print service, printing up to and including the predetermined number of sheets (hereinafter referred to as "contractual number of sheets") of print media for a predetermined period (e.g., one month) is allowed at a flat rate. When printing exceeding the contractual number of sheets of print media within the predetermined period is performed, the user is charged with an additional cost. The additional cost is, for example, a value obtained by multiplying the number of sheets exceeding the contractual number of sheets by an additional unit price. The server 200 includes a communication OF 216 and a controller 230. Each of the units 216 and 230 is connected to a bus line (reference sign omitted). The communication I/F 216 is connected to the Internet 6.

The controller 230 includes a CPU 232 and a memory 234. The CPU 232 executes various processes according to a program 236 stored in the memory 234. The memory 234 further stores a printer table 238, a service table 240, and a price database 242.

The printer table 238 is a table that stores various information about a printer to be managed, and stores an app ID, a serial number, an access token, service subscription information, consumption information, and number-of-sheet information in association with each other. The app ID (e.g., A1) is an app ID of an application installed in the terminal used by the user of the printer. The serial number (e.g., SN1) is a serial number of the printer to be managed. The access token (e.g., AT1) is authentication information to execute communication with the printer. The service subscription information indicates either "YES", indicating that the printer receives the provision of the flat-rate print service, or "NO", indicating that the printer does not receive the provision of the flat-rate print service. The consumption information (e.g., X1) is information indicating consumption of ink in the ink CTG attached to the printer, and is stored in association with the model number of the ink CTG (e.g., M1). The consumption information is information calculated by setting the consumption of ink in a new ink CTG as 0% and the consumption of ink in an empty ink CTG as 100%. The number-of-sheet information (e.g., Y1) is information indicating the number of sheets of print media printed by the printer.

The Service table 240 is a table that stores information related to the flat-rate print service, and stores the app ID, the serial number, shipping destination information, payment information, and number-of-sheet information in association with each other. The shipping destination information (e.g., DI1) is information of a shipping destination (i.e., address) of a single-purpose ink CTG (hereinafter referred to as "single-purpose CTG") for receiving the flat-rate print service. The payment information (e.g., PI1) is information for payment of the flat-rate print service fee (i.e., credit card number). The number-of-sheet information (e.g., Z1) is information indicating the number of sheets of print media printed by the printer by using the flat-rate print service. That is, the number-of-sheet information indicates the number of sheets of print media printed by the printer in the situation where the service setting flag of the printer indicates "YES".

The price database 242 stores, for each one of multiple types of ink CTGs, a price of the ink CTG in association with the model number of the ink CTG.

(Configuration of Server 300)

The server 300 is a server installed by a vendor of a certain ink CTG and stores a price of this ink CTG. Although only one server 300 is illustrated in FIG. 1, there are multiple servers installed by vendors of ink CTGs having different CTG model numbers.

(Registration Process; FIG. 2)

With reference to FIG. 2, a process for registering information about the printer 100 with the server 200 will be described. In the explanation of the process in FIG. 2, the process executed by CPUs (e.g., 32, 132, 232) will be described with the devices (e.g., the terminal 10, the printer 100, the server 200) as subjects of actions, rather than with the CPUs as subjects of the actions. In addition, the following process executed by the terminal 10 is realized by the CPU 32 of the terminal 10 executing the app 38, but instead of describing the app 38 as a subject of actions, the terminal 10 will be described as a subject of the actions. In addition, all communication between the devices is executed via communication I/Fs (e.g., 16, 116, 216). Therefore, in the explanation of the process in FIG. 2, the phrase "via the communication I/F(s)" will be omitted when the communication is explained. The same applies when the processes in FIGS. 3 to 8 are explained.

In response to accepting an operation from a user, the terminal 10 activates the app 38 and accesses a web server in the printer 100 by using this app 38. Then, in response to further accepting an operation from the user to register the information of the printer 100 with the server 200, the terminal 10 sends a registration instruction to the printer 100 in T10. This registration instruction includes the app ID "A1".

When the printer 100 receives a registration instruction from the terminal 10 in T10, the printer 100 sends a registration request to the server 200 in T12. The registration request includes the received app ID "A1" and the serial number "SN1" of the printer 100.

When the server 200 receives the registration request from the printer 100 in T12, the server 200 generates a PIN code and stores, in the memory 234, the application ID "A1" included in the registration request, the serial number "SN1" included in the registration request and the generated PIN code in association with each other in T14.

Next, the server 200 sends the PIN code and a login Uniform Resource Locator (URL) to the printer 100 in T20. The login URL is information indicating a location of authentication screen data, to be described later, in the server 200.

When the printer 100 receives the PIN code and the URL from the server 200 in T20, the printer 100 sends them to the terminal 10 in T22.

When the terminal 10 receives the PIN code and the URL from the printer 100 in T22, the terminal 10 displays them in T30. Next, when the terminal 10 accepts an operation to select the displayed URL from the user in T32, the terminal 10 sends an authentication request including the URL to the server 200 in T40.

When the server 200 receives the authentication request from the terminal 10 in T40, the server 200 sends, to the terminal 10, authentication screen data identified by the URL included in the authentication request in T42. The authentication screen data is data representing the authentication screen for inputting the PIN code.

When the terminal 10 receives the authentication screen data from the server 200 in T42, the terminal 10 displays the authentication screen represented by the authentication screen data on the display unit 14 in T44. Next, when the terminal 10 accepts input of the PIN code displayed in T30 from the user in T46, the terminal 10 sends the inputted PIN code to the server 200 in T50.

When the server 200 receives the PIN code from the terminal 10 in T50, the server 200 executes authentication of the received PIN code in T52. Specifically, the server 200 determines whether the received PIN code has already been stored. In the present case, since the server 200 has already stored the received PIN code (see T14), the server 200 generates an access token "AT1", which is a unique character string, in T54. Then, in T56, the server 200 stores various information in the printer table 238. Specifically, the server 200 stores, in the printer table 238, the application ID "A1" and the serial number "SN1" included in the registration request, the generated access token "AT1", and the service subscription information "NO" in association with each other. At this stage, neither the consumption information nor the number-of-sheet information is stored in the printer table 238.

When the printer 100 receives an authentication notification from the server 200 in T60, the printer 100 stores the access token "AT1" included in the authentication notification in the memory 134 in T62.

Then, in T64, the access token "AT1" is used and a constant connection is established between the printer 100 and the server 200. By using the constant connection, the server 200 can send a request to the printer 100 across the firewall of the LAN 4 to which the printer 100 belongs, even when the server 200 does not receive a request from the printer 100. The constant connection is, for example, an Extensible Messaging and Presence Protocol (XMPP) connection, a connection conforming to Hypertext Transfer Protocol Secure (HTTPS), or the like. In this way, various information about the printer 100 is registered with the server 200.

(Case A; FIG. 3 and FIG. 4)

Next, with reference to FIG. 3 and FIG. 4, a specific case A will be described. FIG. 3 is a continuation of the process in FIG. 2.

In T100, the server 200 uses the established constant connection (see T64 in FIG. 2) to send, to the printer 100, a Subscribe request requesting to the printer 100 periodically send device status information indicating a current status of the printer 100 to the server 200.

When the printer 100 receives the Subscribe request from the server 200 in T100, the printer 100 starts sending the device status information periodically according to the Subscribe request in T102. The device status information includes the serial number "SN1", the consumption information indicating the consumption of ink used by the printer 100, and the number-of-sheet information indicating the number of sheets of the print media printed by the printer 100 (i.e., the number of sheets printed). In particular, the consumption information includes the model number "M1" of the ink CTG attached to the printer 100. In the present embodiment, the consumption information and the number-of-sheet information indicate the consumption and the number of sheets printed in the most recent predetermined period (e.g., one month), respectively. In a modification, the consumption information and the number-of-sheet information may indicate cumulative consumption and the cumulative number of printed sheets of the print media after the shipment of the printer 100, respectively. When printing is executed by using two or more ink CTGs in the most recent predetermined period, the consumption information may include the CTG model number of each ink CTG and the consumption of each ink CTG.

When the server 200 receives the device status information from the printer 100 in T102, the server 200 stores the aforementioned pieces of information included in the device status information in the printer table 238 in T104. Specifically, at first, the server 200 stores the consumption information and the number-of-sheet information included in the device status information in the printer table 238 in association with the serial number "SN1" included in the device status information.

Further, in T110, the server 200 receives, from the server 300, price information indicating a price of an ink CTG (e.g., P1) for each of one or more CTG model numbers (e.g., M1). When the server 200 receives the price information from the server 300, the server 200 updates the price database 242. In this way, the server 200 can obtain the CTG model number and the price.

When the server 200 updates the printer table 238 in T104, the server 200 calculates a first cost C1 in T120. The first cost C1 is a cost when the printer 100 does not receive the provision of the flat-rate print service, and is calculated as follows. First, the server 200 identifies the consumption information associated with the serial number "SN1" from the printer table 238. That is, the server 200 identifies the CTG model number "M1" and the consumption "X1". Next, the server 200 identifies the price "P1" associated with the identified CTG model number "M1" from the price database 242. The server 200 then calculates the value (P1×X1) obtained by multiplying the identified price "P1" by the identified consumption "X1" as the first cost C1. As described above, the server 200 can calculate the first cost C1 based on the consumption information received from the printer 100 (i.e., the CTG model number "M1" and the consumption "X1") and the price "P1" associated with the CTG model number "M1". When the consumption information is not information indicating the ink consumption in the most recent predetermined period (e.g., when the consumption information indicates cumulative consumption), the server 200 may calculate the consumption information per the predetermined period from the aforementioned consumption information, and then calculate the first cost C1 by using the consumption information per the predetermined period.

The server 200 also calculates a second cost C2 in T130. The second cost C2 is a cost when the printer 100 receives the provision of the flat rate print service, and is calculated as follows. First, the server 200 identifies the number-of-sheet information "Y1" associated with the serial number "SN1" from the printer table 238. Next, the server 200 determines whether the identified number-of-sheet information "Y1" is less than or equal to the predetermined contractual number of sheets (e.g., 1000 sheets) of the flat-rate print service. When the number-of-sheet information "Y1" is less than or equal to the contractual number of sheets, the server 200 calculates a monthly fee B1 of the flat-rate print service as the second cost C2. On the other hand, when the number-of-sheet information "Y1" is greater than the contractual number of sheets, the server 200 calculates, as the second cost C2, a value obtained by adding the monthly fee B1 to a value obtained by multiplying the number of sheets exceeding the contractual number of sheets (i.e., (Y1—the contractual number of sheets)) by the additional unit price. When the number-of-sheet information is not information indicating the number of sheets printed in the most recent predetermined period (e.g., when the number-of-sheet information is information indicating the cumulative number of printed sheets), the server 200 may calculate the number-of-sheet information per the predetermined period from this number-of-sheet information and calculate the second cost C2 by using the number-of-sheet information per the predetermined period.

In Case A, the second cost C2 is lower than the first cost C1. That is, if printing is executed at the same pace by the printer 100, the print cost will be lower when the user subscribes to the flat-rate print service. In this case, the server 200 sends first notification screen data with the app ID "A1" as a recipient (i.e., with the terminal 10 as a recipient) in T140.

When the terminal 10 receives the first notification screen data from the server 200 in T140, the terminal 10 displays a notification screen SC1 represented by the first notification screen data on the display unit 14 in T142. The notification screen SC1 includes the first cost C1, the second cost C2, and a message indicating that the second cost C2 is lower than the first cost C1. Thus, by viewing the notification screen SC1, the user can compare the first cost C1 and the second cost C2 and know that the print cost will be lower when the user subscribes to the flat-rate print service. The notification screen SC1 further includes a message asking the user whether to subscribe to the flat-rate print service, a YES button, and a NO button.

(Continuation of FIG. 3; FIG. 4)

When the terminal 10 accepts selection of the YES button in the notification screen SC1 from the user in T150 in FIG. 4, the terminal 10 displays an input screen SC2 on the display unit 14 in T152. The input screen SC2 includes a message prompting the user to input shipping destination information and payment information, an input field for inputting the shipping destination information, an input field for inputting the payment information, an OK button, and a Cancel button.

In T154, the terminal 10 accepts input of the shipping destination information "DI1" and the payment information "PI1" from the user, and then accepts selection of the OK button from the user. In this case, the terminal 10 sends a contract request to the server 200 in T160. The contract request includes the app ID "A1", the inputted shipping destination information "DI1", and the inputted payment information "PI1".

When the server 200 receives the contract request from the terminal 10 in T160, the server 200 generates a PIN code and stores each piece of information in the contract request in the service table 240 in T162 in association with the app ID "A1" in the contract request. The server 200 then sends the generated PIN code to the terminal 10 in T164.

When the terminal 10 receives the PIN code from the server 200 in T164, the terminal displays the PIN code on the display unit 14 in T166. This allows the user to know the PIN code.

When the printer 100 accepts input of the PIN code from the user in T170, the printer 100 changes the service setting flag from "OFF" to "ON" in T172. Then, in T174, the printer 100 sends a start request to the server 200. The start request is a command requesting the start of the flat-rate print service, and includes the inputted PIN code and the serial number "SN1".

When the server 200 receives the start request from the printer 100 in T174, the server 200 executes authentication of the PIN code included in the start request in T176. In the present case, the authentication of the PIN code succeeds, thus the server 200 updates the printer table 238 in T178. Specifically, the server 200 changes the service subscription information associated with the app ID "A1" from "NO" to "YES" in the printer table 238.

In T180, the server 200 executes a single-purpose CTG shipping process. In the single-purpose CTG shipping process, the server 200 identifies the shipping destination information "DI1" associated with the serial number "SN1" from the service table 240. The server 200 then notifies a worker that the single-purpose CTG is to be shipped to the identified shipping destination information "DI1". As a result, the single-purpose CTG is shipped to the user of the printer 100.

As described above, the printer 100 periodically sends the device status information to the server 200. Accordingly, the printer 100 sends the device status information to the server 200 in T182. The process in T182 is the same as the process in T102 in FIG. 3, except that the consumption information and the number-of-sheet information may differ. In this case, the server 200 does not execute the processes of calculating the first cost C1 and the second cost C2. This is because the printer 100 receives the provision of the flat-rate print service, thus the process to prompt the user to subscribe to the flat-rate print service (e.g., the processes of T120 to T142 in FIG. 3) is unnecessary. Since no unnecessary notification is provided to the user, it is possible to suppress the user from feeling that the notification is annoying.

Here, the case in which the second cost C2 is higher than the first cost C1 will be described. In this case, the server 200 does not execute the processes from T140. This is because the first cost C1 when the printer 100 does not receive the provision of the flat-rate print service is lower, thus there is no merit in prompting the user to subscribe to the flat-rate print service. In this way, no unnecessary notification is provided to the user, which can suppress the user from feeling that the notification is annoying.

(First Embodiment Case B; FIG. 5)

Next, with reference to FIG. 5, Case B will be described. Case B is the case in which the price of the ink CTG cannot be obtained on the Internet 6 (i.e., from the server 300, etc.). FIG. is a process continued from FIG. 2. The processes from T200 to T204 are the same as the processes from T100 to T104 in FIG. 3.

In the present case, at the stage of T204, the server 200 does not store the price of the CTG model number "M1" in the price database 242. Furthermore, in Case B, the server 200 cannot obtain the price information on the Internet 6 (i.e., from the server 300, etc.). For example, there may be a situation where the price of the ink CTG having the CTG model number "M1" is not stored in the server 300, and/or the like. In this case, the server 200 sends input screen data with the app ID "A1" as a recipient (i.e., with the terminal 10 as a recipient) in T210. The input screen data includes the CTG model number "M1" included in the device status information received in T202.

When the terminal 10 receives the input screen data from the server 200 in T210, the terminal 10 displays an input screen SC3 on the display unit 14 in T212. The input screen SC3 includes the CTG model number "M1", a message indicating that the ink CTG having the CTG model number "M1" is attached to the printer 100, a message prompting the user to input the price of the ink CTG, a price input field, and an OK button.

In T214, the terminal 10 accepts input of the price "P1" of the ink CTG having the CTG model number "M1" from the user and then accepts selection of the OK button from the user. In this case, the terminal 10 sends the CTG model number "M1" and the inputted price "P1" to the server 200.

When the server 200 receives the CTG model number "M1" and the price "P1" from the terminal 10 in T216, the server 200 stores them in the price database 242 in association with each other. As described above, when the price "P1" of the ink CTG whose type is identified by the CTG model number "M1" is inputted to the terminal 10, the server 200 can obtain the price "P1" of that CTG. The subsequent processes are the same as the processes of T120 to T142 in FIG. 3 and the process in FIG. 4.

Effect of First Embodiment

According to the above configuration, by using the consumption information, the server 200 calculates the first cost C1, which is a print cost when the printer 100 does not receive the provision of the flat-rate print service, and the second cost C2, which is a print cost when the printer 100 receives the provision of the flat-rate print service. The server 200 then displays the notification screen SC1 including the first cost C1 and the second cost C2 on the display unit 14. By viewing the notification screen SC1, the user can check whether he or she should receive the flat-rate print service. This improves user convenience.

(Corresponding Relationships)

The terminal 10 and the printer 100 are an example of "terminal device" and "printer", respectively. The server 200 is an example of "server" and "communication device". The device status information including the consumption information and the number-of-sheet information is an example of "print quantity information". In particular, the consumption information is an example of "consumption information". The flat-rate print service is an example of "print service". The first cost C1 and the second cost C2 are an example of "first cost" and "second cost", respectively. The notification screen SC1 is an example of "related information". The Ink CTG and the ink are an example of "color material cartridge" and "color material", respectively. In particular, the ink CTG attached to the printer 100 (i.e., the ink CTG having the CTG model number "M1") is an example of "target color material cartridge". The CTG model number "M1" and the price "P1" of the ink CTG having the CTG model number "M1" are an example of "target type information" and "target unit price", respectively.

The process of T102 in FIG. 3 is examples of the "receive, from a printer, print quantity information (and receive, from the printer, target type information)" and "obtain print quantity information". The processes of T110, T120, T130, and T140 in FIG. 3 are an example of "receive, for each of the plurality of types of color material cartridges, type information indicating a type of the color material cartridge and a unit price of the color material cartridge from a different server different from the server via the Internet", "calculate a first cost (and obtain a target unit price)", "calculate a second cost", and "output related information", respectively.

SECOND EMBODIMENT

Next, a second embodiment will be described. The second embodiment differs from the first embodiment in the method of updating the price database 242. Specifically, in the second embodiment, the price database 242 is updated by each of the prices of CTGs having different model numbers being inputted by the administrator of the server 200.

(Second Embodiment Case C; FIG. 6)

With reference to FIG. 6, Case C of the second embodiment will be described. FIG. 6 is a process continued from FIG. 2. The processes from T300 to T304 are the same as the processes from T100 to T104 in FIG. 3.

In T306, the server 200 accepts input of a price from the administrator of the server 200. This input includes input of a combination of the CTG model number and the price of the ink CTG of a type having this CTG model number. In particular, in Case C, the input includes input of the combination of the CTG model number "M1" and the price of the ink CTG having the CTG model number "M1". The server 200 then stores the inputted combination in the price database 242 in T308. In this way, the server 200 can obtain the CTG model number and the price. The subsequent processes are the same as the processes of T120 to T142 in FIG. 3 and the process of FIG. 4. The process of T306 in FIG. 6 is an example of "accept input of, for each of the plurality of types of the color material cartridges, type information indicating a type of the color material cartridge and a unit price of the color material cartridge".

THIRD EMBODIMENT

Next, a third embodiment will be described below. The third embodiment differs from the first embodiment in that the device status information does not include the CTG model number.

(Third Embodiment Case D; FIG. 7)

First, with reference to FIG. 7, Case D of a third embodiment will be described. FIG. 7 is a process continued from FIG. 2. The process of T400 is the same as the process of T100 in FIG. 3. In T402, the printer 100 sends the device status information to the server 200. The device status information sent in T402 is the same as the device status information sent in T100 of FIG. 3, except that the CTG model number is not included in the consumption information.

When the server 200 receives the device status information from the printer 100 in T402, the server 200 stores the device status information in the printer table 238 in T404. Specifically, at first, the server 200 stores the consumption information and the number-of-sheet information included in the device status information in the printer table 238 in association with the serial number "SN1" included in the device status information. In particular, in the third embodiment, the CTG model number is not associated with the consumption information at this stage because the consumption information does not include the CTG model number.

The server 200 sends second notification screen data with the application ID "A1" as a recipient (i.e., with the terminal 10 as a recipient) in T410. The second notification screen data includes the serial number "SN1" included in the device status information received in T402.

When the terminal 10 receives the second notification screen data from the server 200 in T410, the terminal 10 displays a notification screen SC4 represented by the second notification screen data on the display unit 14 in T412. The notification screen SC4 includes the serial number "SN1", a message prompting the user to either capture (photograph) the ink CTG attached to the printer or input the CTG model number of this ink CTG, a capture button, and an input button.

In T414, the terminal 10 accepts selection of the capture button in the notification screen SC4 from the user. In this case, the terminal 10 activates a camera (not illustrated). The user then captures the ink CTG attached to the printer 100 in T414. In this case, the terminal 10 sends the serial number "SN1" and image data representing an image of the captured ink CTG to the server 200 in T416.

When the server 200 receives the serial number "SN1" and image data from the terminal 10 in T416, the server 200 obtains the CTG model number "M1" of the ink CTG by analyzing the image data in T420. Then, in T422, the server 200 stores the obtained CTG model number "M1" in association with the consumption information "X1" associated with the serial number "SN1". In this way, the server 200 can obtain the CTG model number "M1" of the ink CTG attached to the printer 100. The subsequent processes are the same as the processes of T110 to T142 in FIG. 3 and the process of FIG. 4. The process of T416 and the process of T420 in FIG. 7 are examples of "receive, from a terminal device, image data" and "identify target type information" respectively.

(Third Embodiment Case E; FIG. 8)

Next, with reference to FIG. 8, Case E of the third embodiment will be described. Case E differs from Case D of the third embodiment in a method of obtaining the CTG model number "M1". FIG. 8 is a process continued from FIG. 2. The processes of T500 to T512 are the same as the processes of T400 to T412 of FIG. 7.

In T514, the terminal 10 accepts selection of the input button in the notification screen SC4 from the user. In this case, the terminal 10 displays a CTG model number input screen (not illustrated) on the display unit 14 and accepts input of the CTG model number "M1" of the ink CTG attached to the printer 100 on the input screen. The terminal 10 then sends the serial number "SN1" and the inputted CTG model number "M1" to the server 200 in T516. The process of T522 is the same as the process of T422 in FIG. 7. In this way, the server 200 can obtain the CTG model number "M1" of the ink CTG attached to the printer 100. The process of T516 in FIG. 8 is an example of "receive, from a terminal device, target type information".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) The print engine 118 of the printer 100 may be a print mechanism of a laser scheme instead of a print mechanism of an inkjet scheme. That is, the print engine 118 of the printer 100 may use toner in a toner CTG, instead of the ink CTG, to execute printing on a print medium. In the present modification, the toner CTG and the toner are an example of "color material cartridge" and "color material," respectively.

(Modification 2) In the above embodiments, the flat-rate print service was described, however, the technique disclosed herein can also be applied to, for example, a pay-per-use print service (i.e., a print service that charges the user with a fee based on the number of printed sheets). In the present modification, in T130 in FIG. 3, a value obtained by multiplying the number of sheets information "Y1" by a unit price is calculated as the second cost C2. Then, when the second cost C2 is lower than the first cost C1, the processes from T140 may be executed. In the present modification, the pay-per-use print service is an example of "print service".

(Modification 3) The printer 100 may send the device status information including the serial number "SN1", the CTG model number "M1", and the number-of-sheet information to the server 200 in T102 in FIG. 3. In this case, the server 200 may calculate the ink consumption based on the received number-of-sheet information and calculate the first cost C1 by using the calculated ink consumption and the price associated with the CTG model number. In the present modification, "print quantity information" may not include "consumption information". In another modification, the server 200 may store a cost per print sheet in advance and calculate the first cost C1 using the received number-of-sheet information and the stored cost. The cost per print sheet may be a value calculated based on, for example, average coverage (i.e., average print density on the print media). In the present modification, "print quantity information" may not include "consumption information", and "obtain a target unit price" may be omitted.

(Modification 4) In T142 in FIG. 3, the terminal 10 may display, on the display unit 14, a screen which does not include the first cost C1 or the second cost C2 and includes at least one of a message indicating that the second cost C2 is lower than the first cost C1 and a message asking the user whether to subscribe to the flat rate print service. In T142 of FIG. 3, the terminal 10 may also display, on the display unit 14, a screen which does not include the above message and includes only the first cost C1 and the second cost C2. Generally speaking, the "related information" may be any information "related to the first cost and the second cost".

(Modification 5) The server 200 may send the first notification screen data to the printer 100 instead of the terminal 10 in T140. In another modification, the server 200 may send, to the terminal 10, a URL representing a location of the notification screen SC1 on the server 200 represented by the first notification screen data instead of the first notification screen data. In another modification, an email address available to the terminal 10 may be stored in the printer table 238 instead of the app ID, and the above URL may be sent to the terminal 10 with the email address as a recipient. Generally speaking, the method to "output related information" is not limited to the aspects of the embodiments.

(Modification 6) In T216 in FIG. 5, the terminal 10 may not send the CTG model number "M1" to the server 200. In the present modification, the server 200 may omit the process of T218 in FIG. 5. In this case, the server 200 may calculate the first cost C1 using the received price "P1" (see T120 in FIG. 4).

(Modification 7) The server 200 may execute the process of calculating the first cost C1 and second cost C2 even when the service subscription information indicates "YES" in T182 in FIG. 4.

(Modification 8) In each of the above embodiments, the process of calculating the first cost C1 and the second cost C2 is executed by the server 200. Instead of this, the process of calculating the first cost C1 and the second cost C2 may be executed by the printer 100. Specifically, the printer 100 stores the price database 242. In T102 in FIG. 3, the printer 100 obtains the device status information from the memory 134 of the printer 100 and sends the same to the server 200. The printer 100 then calculates the first cost C1 in place of the server 200 based on the price identified from the price database 242 and the consumption information included in the obtained device status information, as in T120. The printer 100 calculates the second cost C2 in place of the server 200 based on the number-of-sheet information included in the obtained device status information, as in T130. When the second cost C2 is lower than the first cost C1, the printer 100 outputs information indicating that the second cost C2 is lower than the first cost C1. For example, the printer 100 may display a URL representing a location of the first notification screen data in the server 200. By the URL being inputted to the terminal 10, the notification screen SC1 (see FIG. 3) is displayed on the terminal 10. In another example, the printer 100 may display a code image obtained by encoding the above URL. In this case, the notification screen SC1 is displayed on the terminal 10 by the code image being read by the terminal 10. In another example, the printer 100 may display the notification screen SC1 on the display unit 114 or send the first notification screen data representing the notification screen SC1 to the terminal 10. In the present modification, the printer 100 is an example of "communication device".

(Modification 9) The process of calculating the first cost C1 and the second cost C2 may be executed by the terminal 10. Specifically, the terminal 10 stores the price database 242. When the server 200 receives the device status information from the printer 100 in T102 in FIG. 3, the server 200 sends the device status information with the app ID "A1" of the terminal 10 as a recipient. In another modification, the device status information may be sent from the printer 100 to the terminal 10 without going through the server 200. The terminal 10 calculates the first cost C1 in place of the server 200 based on the price identified from the price database 242 and the consumption information included in the received device status information, as in T120. The terminal 10 also calculates the second cost C2 in place of the server 200 based on the number-of-sheet information included in the received device status information, as in T130. The terminal 10 may then display the notification screen SC1 when the second cost C2 is lower than the first cost C1 (see T142 in FIG. 3). In the present modification, the terminal 10 is an example of "communication device".

(Modification 10) In the above embodiments, each of the processes in FIGS. 2 to 8 is realized by software (e.g., the OS program 36, the app 38, the programs 136, 236), however, at least one of these processes may be realized by hardware such as a logic circuit.

What is claimed is:

1. A server comprising a controller;
wherein the controller is configured to:
receive, from a printer, print quantity information related to a print quantity of the printer;
in a state where the printer has not received provision of a print service realized by the server, calculate a first cost by using the print quantity information, the first cost being a print cost when the printer does not receive the provision of the print service, wherein in a state where the printer has received the provision of the print service, the first cost is not calculated;
in the state where the printer has not received the provision of the print service, calculate a second cost by using the print quantity information, the second cost being a print cost when the printer receives the provision of the print service, wherein in the state where the printer has received the provision of the print service, the second cost is not calculated; and
in the state where the printer has not received the provision of the print service, output related information which is related to the calculated first cost and the calculated second cost, wherein in the state where the printer has received the provision of the print service, the related information is not outputted.

2. The server as in claim 1,
wherein the print quantity information includes consumption information that indicates consumption of color material in a target color material cartridge which is a color material cartridge attached to the printer,
wherein the controller is configured to calculate the first cost by using the consumption indicated by the consumption information included in the print quantity information.

3. The server as in claim 2,
wherein the controller is further configured to obtain a target unit price which is a unit price of the target color material cartridge,
wherein the controller is configured to calculate the first cost by using the consumption and the target unit price.

4. The server as in claim 3, further comprising a memory configured to store, for each of a plurality of types of color material cartridges, type information indicating a type of the color material cartridge and a unit price of the color material cartridge in association with each other,
wherein the controller is further configured to receive, from the printer, target type information indicating a type of the target color material cartridge, wherein the controller is configured to obtain, from the memory, the target unit price associated with the target type information.

5. The server as in claim 4, wherein
the server is connected to the Internet, and
the controller is further configured to receive, for each of the plurality of types of color material cartridges, type information indicating a type of the color material cartridge and a unit price of the color material cartridge from a different server different from the server via the Internet.

6. The server as in claim 4,
wherein the controller is further configured to accept input of, for each of the plurality of types of the color material cartridges, type information indicating a type of the color material cartridge and a unit price of the color material cartridge from an administrator of the server.

7. The server as in claim 3, further comprising a memory configured to store, for each of a plurality of types of color material cartridges, type information indicating a type of the color material cartridge and a unit price of the color material cartridge in association with each other,
wherein the controller is further configured to:
receive, from a terminal device, image data representing the target color material cartridge captured by the terminal device; and
identify target type information indicating a type of the target color material cartridge by analyzing the image data,
wherein the controller is configured to obtain, from the memory, the target unit price associated with the target type information.

8. The server as in claim 3, further comprising a memory configured to store, for each of a plurality of types of color material cartridges, type information indicating a type of the color material cartridge and a unit price of the color material cartridge in association with each other, and
the controller is further configured to receive, from a terminal device, target type information indicating a type of the target color material cartridge, the target type information being inputted to the terminal device by a user of the terminal device,
wherein the controller is configured to obtain, from the memory, the target unit price associated with the target type information.

9. The server as in claim 3,
wherein the controller is configured to obtain the target unit price by receiving, from a terminal device, the target unit price inputted to the terminal device by a user of the terminal device.

10. The server as in claim 1,
wherein the print service is a flat-rate print service that permits printing on up to and including a predetermined number of sheets of print media for a predetermined period at a flat rate.

11. The server as in claim 1,
wherein the related information includes both the first cost and the second cost.

12. A non-transitory computer-readable recording medium storing computer-readable instructions for a server, the computer-readable instructions, when executed by a processor of the server, cause the server to:
receive, from a printer, print quantity information related to a print quantity of the printer;
in a state where the printer has not received provision of a print service realized by the server, calculate a first cost by using the print quantity information, the first cost being a print cost when the printer does not receive the provision of the print service, wherein in a state where the printer has received the provision of the print service, the first cost is not calculated;
in the state where the printer has not received the provision of the print service, calculate a second cost by using the print quantity information, the second cost being a print cost when the printer receives the provision of the print service, wherein in the state where the printer has received the provision of the print service, the second cost is not calculated; and
in the state where the printer has not received the provision of the print service, output related information which is related to the calculated first cost and the calculated second cost, wherein in the state where the printer has received the provision of the print service, the related information is not outputted.

13. A method performed by a server, the method comprising:
receiving, from a printer, print quantity information related to a print quantity of the printer;
in a state where the printer has not received provision of a print service realized by the server, calculating a first cost by using the print quantity information, the first cost being a print cost when the printer does not receive the provision of the print service,
wherein in a state where the printer has received the provision of the print service, the first cost is not calculated;
in the state where the printer has not received the provision of the print service, calculating a second cost by using the print quantity information, the second cost being a print cost when the printer receives the provision of the print service, wherein in the state where the printer has received the provision of the print service, the second cost is not calculated; and
in the state where the printer has not received the provision of the print service, outputting related information which is related to the calculated first cost and the calculated second cost, wherein in the state where the printer has received the provision of the print service, the related information is not outputted.

14. A communication device comprising a controller;
wherein the controller is configured to:
obtain print quantity information related to a print quantity of a printer;
in a state where the printer has not received provision of a print service realized by a server, calculate a first cost by using the print quantity information, the first cost being a print cost when the printer does not receive the provision of the print service server, wherein in a state where the printer has received the provision of the print service, the first cost is not calculated;
in the state where the printer has not received the provision of the print service, calculate a second cost by using the print quantity information, the second cost being a print cost when the printer receives the provision of the print service, wherein in the state where the printer has received the provision of the print service, the second cost is not calculated; and
in the state where the printer has not received the provision of the print service, output related information which is related to the calculated first cost and the calculated second cost, wherein in the state where the printer has received the provision of the print service, the related information is not outputted.

15. A non-transitory computer-readable recording medium storing computer-readable instructions for a communication device, the computer-readable instructions, when executed by a processor of the communication device, cause the communication device to:

obtain print quantity information related to a print quantity of a printer;

in a state where the printer has not received provision of a print service realized by a server, calculate a first cost by using the print quantity information, the first cost being a print cost when the printer does not receive the provision of the print service, wherein in a state where the printer has received the provision of the print service, the first cost is not calculated;

in the state where the printer has not received the provision of the print service, calculate a second cost by using the print quantity information, the second cost being a print cost when the printer receives the provision of the print service, wherein in the state where the printer has received the provision of the print service, the second cost is not calculated; and in the state where the printer has not received the provision of the print service, output related information which is related to the calculated first cost and the calculated second cost, wherein in the state where the printer has received the provision of the print service, the related information is not outputted.

16. A method performed by a communication device, the method comprising:

obtaining print quantity information related to a print quantity of a printer;

in a state where the printer has not received provision of a print service realized by a server, calculating a first cost by using the print quantity information, the first cost being a print cost when the printer does not receive the provision of the print service, wherein in a state where the printer has received the provision of the print service, the first cost is not calculated;

in the state where the printer has not received the provision of the print service, calculating a second cost by using the print quantity information, the second cost being a print cost when the printer receives the provision of the print service, wherein in the state where the printer has received the provision of the print service, the second cost is not calculated; and in the state where the printer has not received the provision of the print service, outputting related information which is related to the calculated first cost and the calculated second cost, wherein in the state where the printer has received the provision of the print service, the related information is not outputted.

* * * * *